United States Patent [19]

Muramatsu et al.

[11] Patent Number: 5,294,497
[45] Date of Patent: Mar. 15, 1994

[54] BATTERY BOX USING A MINIATURE-MOTOR PACKAGE

[75] Inventors: Shinichi Muramatsu; Hiromichi Kaneko; Shinichi Nakayama; Takeshi Akiyama, all of Matsudo, Japan

[73] Assignee: Mabuchi Motor Co., Ltd., Chiba, Japan

[21] Appl. No.: 953,650

[22] Filed: Sep. 29, 1992

[30] Foreign Application Priority Data

Oct. 21, 1991 [JP] Japan ............................ 3-085603[U]

[51] Int. Cl.⁵ ............................................ H01M 2/10
[52] U.S. Cl. ................................... 429/97; 429/100
[58] Field of Search ................... 429/7, 97, 99, 100, 429/167, 176

[56] References Cited

U.S. PATENT DOCUMENTS

| | | | |
|---|---|---|---|
| 3,881,961 | 5/1975 | Nation | 429/99 X |
| 3,963,972 | 6/1976 | Todd | 429/97 X |
| 3,990,919 | 11/1976 | Kraeger | 429/100 |
| 4,230,777 | 10/1980 | Gatto | 429/97 |

Primary Examiner—Anthony Skapars
Attorney, Agent, or Firm—McGlew and Tuttle

[57] ABSTRACT

A battery box using a miniature-motor package comprising an upper part and a lower part, both of which have openings and can be joined together at the openings thereof to form a space for housing a miniature motor or other components, in which terminal mounts formed in such a manner that battery-connecting terminals, made of an electrically conductive material, are provided on the edges of the openings of the upper part and/or the lower part in such a manner as to face with each other, and a switch, made of an electrically conductive material, is rotatably provided near any one of the terminal mounts.

7 Claims, 3 Drawing Sheets

BATTERY BOX USING A MINIATURE-MOTOR PACKAGE

BACKGROUND OF THE INVENTION

This invention relates generally to a battery box for housing batteries as the power source for a miniature motor, and more particularly to a battery box using a package for miniature motor used for models and materials for handicraft and science lessons.

DESCRIPTION OF THE PRIOR ART

Miniature motors, as typically represented by small-sized d-c motors, have been widely used as a drive unit for models and various other devices, or as materials for handicraft and science lessons. In particular, demand for miniature motors among model hobbyists has been increasing in recent years because miniature motors of the latest model can be easily driven by commercially available small-sized dry batteries.

Miniature motors, dry batteries as the power source for the motors, connecting terminals, switches and other electrical circuit components are commercially available as separate products manufactured by different manufacturers. As a result, users purchasing miniature motors usually procure such components separately. It is not unusual that battery boxes for holding drive batteries at a predetermined position are also commercially available as specially made ones, depending on the capacity and size of batteries. A new battery box must therefore be bought even for miniature motors of the same size if their voltage and current requirements are different. Furthermore, a commonly practiced method of connecting the lead wires from a miniature motor to other electrical components is to pass the tip of the lead wire through a connecting hole provided on the component and then twist the wire.

Commercially available miniature motors are usually housed in a rigid package, made of a plastic material, for example, to prevent unwanted damage caused during handling or transportation in distribution channels from manufactures to general users. After being unpacked by users, such packages are generally discarded without recycling, leading to an increase in waste generation.

Battery boxes for housing batteries have to be purchased as specially suitable ones for the size of batteries used, as noted earlier. The same applies to the cases for switches and other electrical components, which have to be bought separately. From the viewpoint of users, such as model hobbyists, procurement of such components is troublesome and uneconomical.

As noted earlier, when connecting the lead wires of a miniature motor to battery and switch terminals to form electrical circuits, the lead wires have to be passed through the terminal holes and then the core wires have to be twisted. This not only makes the connection and disconnection of the lead wires troublesome, but also tends to cause imperfect electrical contacts, or it breaks the lead wire due to the repeated connecting and disconnecting of the lead wires to repair poor electrical contacts.

SUMMARY OF THE INVENTION

It is an object of this invention to provide a battery box using a miniature-motor package by improving the package for the miniature motor so as to have a function to house batteries.

It is another object of this invention to provide a battery box using a miniature-motor package that can positively and easily connect and disconnect the lead wires of a miniature motor.

DETAILED DESCRIPTION OF THE EMBODIMENTS

Figure 1:
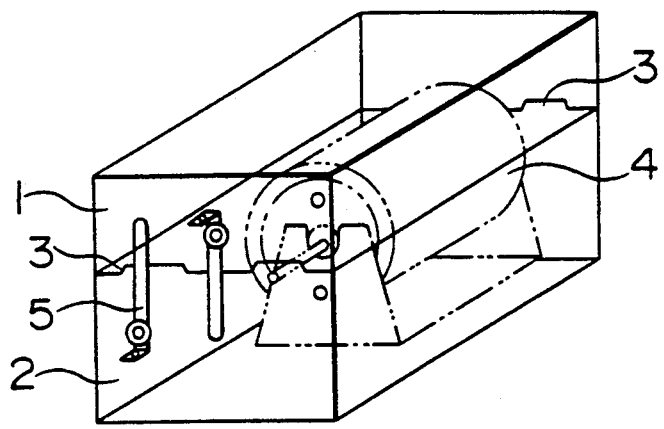
FIG. 1 is a perspective view illustrating an embodiment of this invention.

FIG. 1 is a perspective view illustrating an embodiment of this invention. In FIG. 1, reference numeral 1 refers to an upper part; 2 to a lower part, each made of a transparent resin material, for example, and formed into a rectangular parallelepiped box having an opening. On the short sides of the openings of the upper and lower parts 1 and 2 there are provided joggled portions 3 that can be joined with each other to form a terminal mount, which will be described later. Inside the upper and lower parts 1 and 2 there is formed a space for accommodating the miniature motor 4 and other components. Numeral 5 refers to a switch, made of an electrically conductive material, such as a copper plate, and formed into an L shape. The switch 5 is provided rotatably near the joggled portions 3. Although lead wires are normally provided on a miniature motor 4, they are not shown in the figures.

Figure 2:
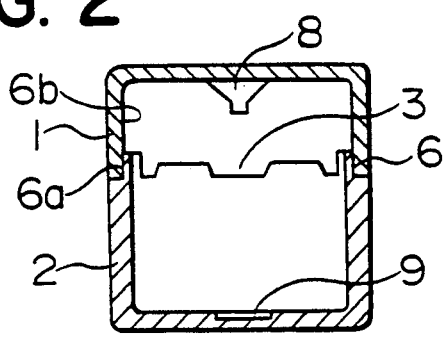
FIG. 2 is a cross-sectional view of an upper part and a lower part shown in FIG. 1 at the middle part thereof in the longitudinal direction.
Figure 3A:
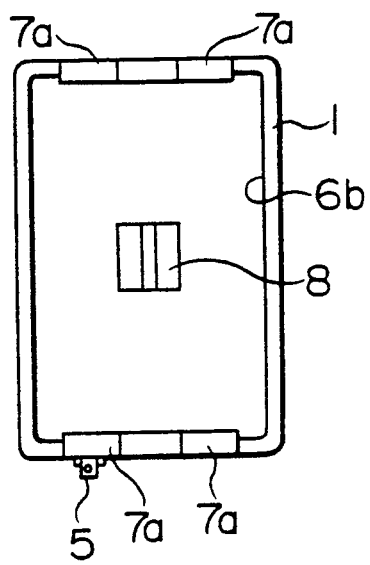
FIGS. 3A and 3B are end views of the upper part and the lower part, respectively, shown in FIG. 2.
Figure 3B:
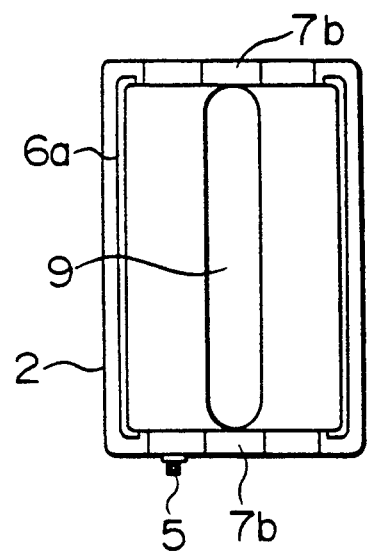

FIG. 2 is a cross-sectional view of the upper and lower parts 1 and 2 shown in FIG. 1 at the middle part thereof in the longitudinal direction. FIGS. 3A and 3B are end views of the upper part 1 and the lower part 2 shown in FIG. 2. In these figures, numeral 6 refers to a rabbet (rebated) joint formed in such manner that a protruded (or shouldered) edges 6a provided on the long sides of the lower part 2 is matched with an inner surfaces 6b on the long sides of the upper part 1. Numerals 7a and 7b refer to terminal mounts, each provided on the short sides of the openings of the upper and lower parts 1 and 2 in a mutually opposing manner. These terminal mounts 7a and 7b are formed by cutting the short sides of the openings of the upper and lower parts 1 and 2, and these terminal mounts 7a and 7b form the joggled portions 3 shown in FIG. 1, when the upper and lower parts 1 and 2 are joined and engaged with each other at the openings thereof. Numerals 8 and 9 refer to positioning parts provided by protruding and boring the bottoms of the upper and lower parts 1 and 2, respectively.

With the aforementioned construction, the miniature motor 4 is housed in the lower part 2, as shown in FIG. 1, together with battery-connecting terminals and other components, which will be described later, and then the upper part 1 is placed on the lower part 2. Thus, the upper and lower parts 1 and 2 are matched with each other at a predetermined position thanks to the engagement achieved by the joggled portions 3 and the rabbet (rebated) joint 6 shown in FIG. 2. In this way, the miniature motor 4 and other components are packaged for protection from damage during handling or transportation.

Figure 4A:
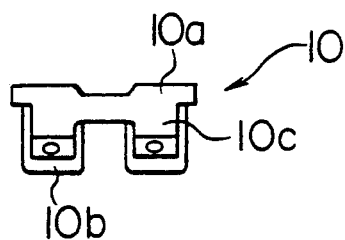
FIGS. 4A and 4B are a front view and a side view illustrating terminals for connecting batteries.
Figure 4B:
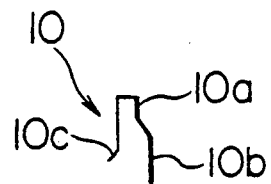
Figure 5A:
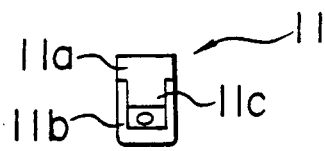
FIGS. 5A and 5B are a front view and a side view illustrating other terminals for connecting batteries.
Figure 5B:
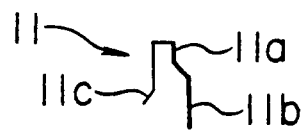

FIGS. 4A and 4B are a front view and a side view illustrating battery-connecting terminals. FIGS. 5A and 5B are a front view and a side view illustrating other battery-connecting terminals. In FIGS. 4A and 4B, the battery-connecting terminals 10 is made of an electrically conductive material, such as copper plate, and formed by bending and other forming operations into a clip portion 10a that can be clipped on the terminal mount 7a of the upper part 1 shown in FIG. 3A. 10b indicates an electrical contact to the battery, and 10c a lead terminal; two pieces each of which are provided on the battery-connecting terminal 10. In FIGS. 5A and 5B, a battery-connecting terminal 11 is formed in the same manner as in the case of the battery-connecting terminal 10 shown in FIG. 4. The battery-connecting terminal 11 has a clip portion 11a formed in such a manner that the clip portion can be clipped on the terminal mount 7b of the lower part 2 shown in FIG. 3B above, an electrical contact 11b to the battery, and a lead terminal 11c.

With the above construction, the battery-connecting terminal 10 shown in FIGS. 4A and 4B is fitted to the terminal mount 7a on the upper part 1 shown in FIG. 3A, with the electrical contact 10b disposed inside, and the battery-connecting terminal 11 shown in FIGS. 5A and 5B is fitted to the other side of the other terminal mount 7a in the same manner. Thus, a battery box can be formed. In this case, two U-3 dry batteries can be housed in parallel, and positioned with the positioning part 8. When the battery-connecting terminal 11 shown in FIGS. 5A and 5B is fitted to the terminal mount 7b on the lower part 2 shown in FIG. 3B in the same manner as above, a battery box for U-2 batteries can be formed, and the U-2 batteries can be positioned with the positioning part 9.

Figure 6A:
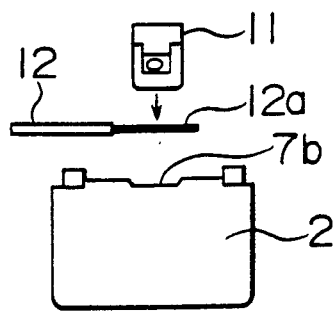
FIGS. 6A and 6B are diagrams of assistance in explaining the state before the lead wire of a miniature motor is connected, and the state after the lead wire is connected.
Figure 6B:
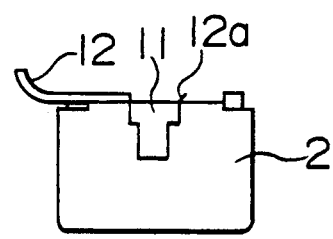

Next, FIGS. 6A and 6B are diagrams of assistance in explaining the state before the lead wires of the miniature motor are connected and the state after the wires are connected, respectively. In FIGS. 6A and 6B, numeral 12 refers to a lead wire, with the core wire 12a exposed at one end thereof. As shown in FIG. 6A, the core wire 12a is placed on the terminal mount 7b, and the battery-connecting terminal 11 is placed in the direction shown by an arrow in the figure, the core wire 12a can be fixedly fitted between the battery-connecting terminal 11 and the lower part 2. Thus, electrical connection between the core wire 12a and the battery-connecting terminal 11 can be positively accomplished, a shown in FIG. 6B.

Figure 7:
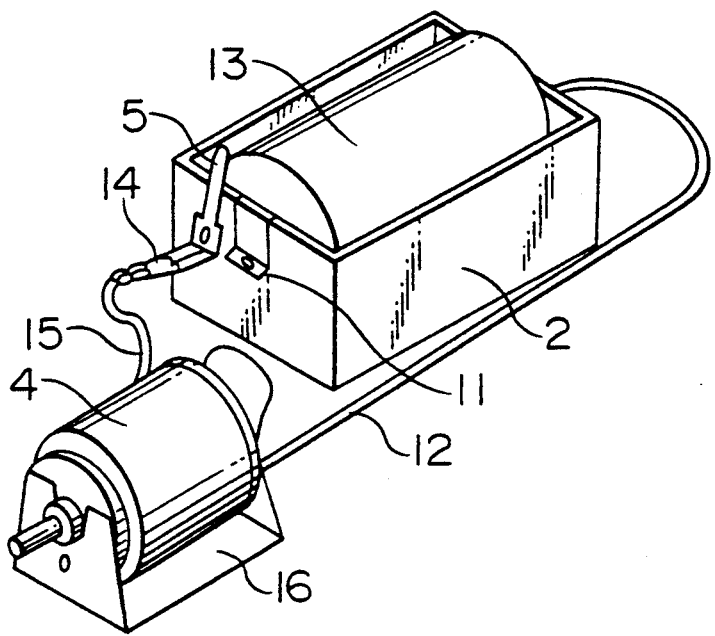
FIG. 7 is a perspective view illustrating the state where the miniature motor is connected to the battery box.

FIG. 7 is a perspective view illustrating the state where the miniature motor is connected to the battery box. Like parts are indicated by like numerals used in FIGS. 1 through 6A and 6B. In FIG. 7, numeral 13 refers to a U-2 battery, housed in the lower part 2 constituting a battery box. Numeral 14 refers to a receptacle terminal provided at the end of the other lead wire 15 of the miniature motor 4. An electrical circuit is formed by connecting the receptacle terminal 14 to the end of the switch 5. Consequently, as the switch 5 is turned clockwise to connect to the battery-connecting terminal 11, the miniature motor 4 supported by a motor base 16 can be driven by the U-2 dry battery 13.

Figure 8:
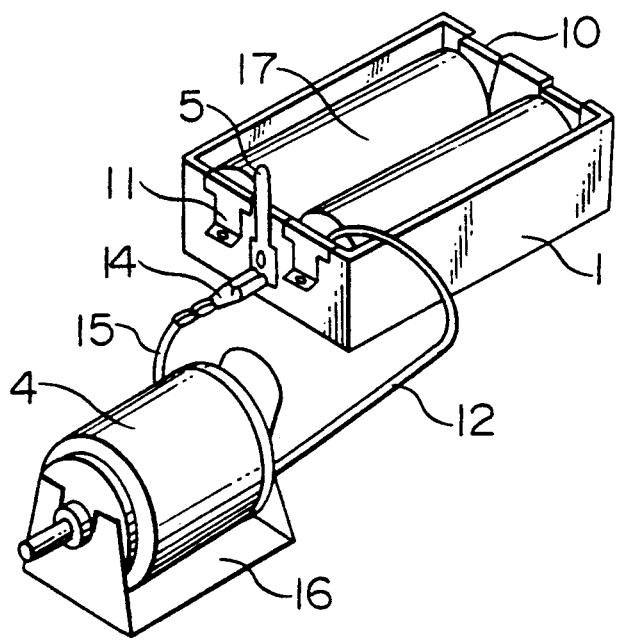
FIG. 8 is a perspective view illustrating the state where the miniature motor is connected to another battery box.

FIG. 8 is a perspective view showing the state where the miniature motor is connected to another example of battery box. Like parts are indicated by like numerals used in FIGS. 1 through 7 above. In FIG. 8, numeral 17 refers to a U-3 dry battery, two of which are housed in parallel in the upper part 1 constituting a battery box. With the above construction, when the switch 5 is turned counterclockwise to connect to the battery-connecting terminal 11 on the left side, then the miniature motor 4 supported by a motor base 16 can be driven by two U-3 dry batteries 17. In FIG. 8, if the lead wire 12 is connected to the battery-connecting terminal 10, the voltage applied to the miniature motor 4 can be changed.

In this embodiment, description has been made on an example where an upper part 1 and a lower part 2 constituting a battery box are formed into a rectangular parallelepiped shape. However, they are not limited to a rectangular parallelepiped shape, but may be of other shapes so long as the upper and lower parts can be joined at the openings thereof and can ensure a space for housing the miniature motor and others. Component members may be made of any known structural materials. The materials should preferably be transparent, but may not necessarily be transparent. The types and quantities of batteries to be housed in the upper and lower parts 1 and 2 can be selected appropriately, depending on the specifications of the miniature motor 4 to which this invention is applied. Battery-connecting terminals can also be selected to meet such specifications.

This invention having the aforementioned construction and operation can accomplish the following effects.

(1) Since packages used for protection of miniature motors, etc. from damage during transporation are recycled as battery boxes for housing batteries for driving miniature motors without discarding packaging materials, resources recycling and waste reduction can be accomplished.

(2) Battery boxes need not be procured separately, reducing time and labor for making models or various educational materials.

(3) Connecting and disconnecting batteries to lead wire in a battery box can be easily achieved, leading to positive electrical connection and substantially improved reliability (4) Battery boxes produced can be used for multiple types of batteries to meet current and voltage needs.

What is claimed is:

1. A battery box formed of a miniature motor package, comprising:
    an upper package part including walls forming an upper portion of a housing and including wall edges defining a lower opening;
    a lower package part including walls forming a lower portion of a housing and including wall edges defining an upper opening, said upper housing part being joined with said lower housing part at said edges to form the battery box;
    indented portions formed in edges in at least one of said upper housing part and said lower housing part to define terminal mounting means with terminal mounts for receiving battery-connecting terminals, said battery-connecting terminals being formed of electrically conductive material, one of said upper part and said lower part having two terminal mounts and another of said upper part and said lower parts having four terminal mounts;

a switch formed of an electrically conductive material, said switch being rotatably mounted adjacent to one of said terminal mounts on said upper part;

an additional switch made of electrically conductive material, said additional switch being rotatably mounted adjacent to one of said terminal mounts on said lower part.

2. A battery box using a miniature motor package according to claim 1, wherein: said upper part and said lower part are made of transparent material.

3. A battery box using a miniature motor package according to claim 1, wherein: a positioning part is provided formed by a inside bottom portion of said upper part protruding toward said opening to defining battery receiving means for receiving two batteries.

4. A battery box using a miniature motor package according to claim 1, wherein: a positioning part is provided formed by a boring provided in an inside bottom portion of said lower part, said boring defining a single battery receiving member for receiving a single battery.

5. A battery box using a miniature motor package according to claim 1, wherein:
 a positioning part is provided formed by a inside bottom portion of said upper part protruding toward said opening to defining battery receiving means for receiving two batteries; and
 a positioning part is provided formed by a boring provided in an inside bottom portion of said lower part, said boring defining a single battery receiving member for receiving a single battery.

6. A battery box formed of a miniature motor package, comprising:
 an upper package part including walls forming an upper portion of a housing and including wall edges defining a lower opening;
 a lower package part including walls forming a lower portion of a housing and including wall edges defining an upper opening, said upper housing part being joined with said lower housing part at said edges to form the battery box;
 battery connecting terminals formed of conductive metal;
 indented portions formed in edges in at least one of said upper housing part and said lower housing part to define terminal mounting means providing mounting seats for receiving said battery connecting terminals, one of said upper part and said lower part having two mounting seats and another of said upper part and said lower parts having more than two mounting seats.
 a switch formed of an electrically conductive material, said switch being rotatably mounted adjacent to one of said terminal mounts on said upper part;
 an additional switch made of electrically conductive material, said additional switch being rotatably mounted adjacent to one of said terminal mounts on said lower part.

7. A battery box using a miniature motor package according to claim 6, wherein:
 a positioning part is provided formed by a inside bottom portion of said upper part protruding toward said opening to defining battery receiving means for receiving two batteries;
 a positioning part is provided formed by a boring provided in an inside bottom portion of said lower part said boring defining a single battery receiving member for receiving a single battery.

* * * * *

REEXAMINATION CERTIFICATE (3935th)

United States Patent [19]
Muramatsu et al.

[11] B1 5,294,497
[45] Certificate Issued Nov. 16, 1999

[54] BATTERY BOX USING A MINIATURE-MOTOR PACKAGE

[75] Inventors: Shinichi Muramatsu; Hiromichi Kaneko; Shinichi Nakayama; Takeshi Akiyama, all of Matsudo, Japan

[73] Assignee: Mabuchi Motor Co., Ltd., Matsudo, Japan

Reexamination Request:
No. 90/004,840, Nov. 14, 1997

Reexamination Certificate for:
Patent No.: 5,294,497
Issued: Mar. 15, 1994
Appl. No.: 07/953,650
Filed: Sep. 29, 1992

[30]       Foreign Application Priority Data

Oct. 21, 1991   [JP]   Japan ............................... 3-085603 U

[51]  Int. Cl.⁶ ...................................................... H01M 2/10
[52]  U.S. Cl. ............................................... 429/97; 429/100
[58]  Field of Search ................................. 429/96–100, 1, 429/7, 123, 121, 178, 179; 439/500

[56]                References Cited

U.S. PATENT DOCUMENTS 3,887,394   6/1975   Kaye ........................................... 429/99
4,091,187   5/1978   Kaye ..................................... 429/100 X
5,395,263   3/1995   Sandell ..................................... 439/500

OTHER PUBLICATIONS

Sep. 20, 1991 D1 *Hobbys, No. 1301*.

Oct. 1, 1991 D2 *Toy Journal, No. 972*.

Oct. 5, 1991 D3 *Kids Life*.

Oct. 7, 1991 D4 *Toys Magazine, No. 685*.

Oct. 14, 1991 D5 *B–Young Age, No. 753*.

*Primary Examiner*—S. J. Kalafut

[57]                ABSTRACT

A battery box using a miniature-motor package comprising an upper part and a lower part, both of which have openings and can be joined together at the openings thereof to form a space for housing a miniature motor or other components, in which terminal mounts formed in such a manner that battery-connecting terminals, made of an electrically conductive material, are provided on the edges of the openings of the upper part and/or the lower part in such a manner as to face with each other, and a switch, made of an electrically conductive material, is rotatably provided near any one of the terminal mounts.

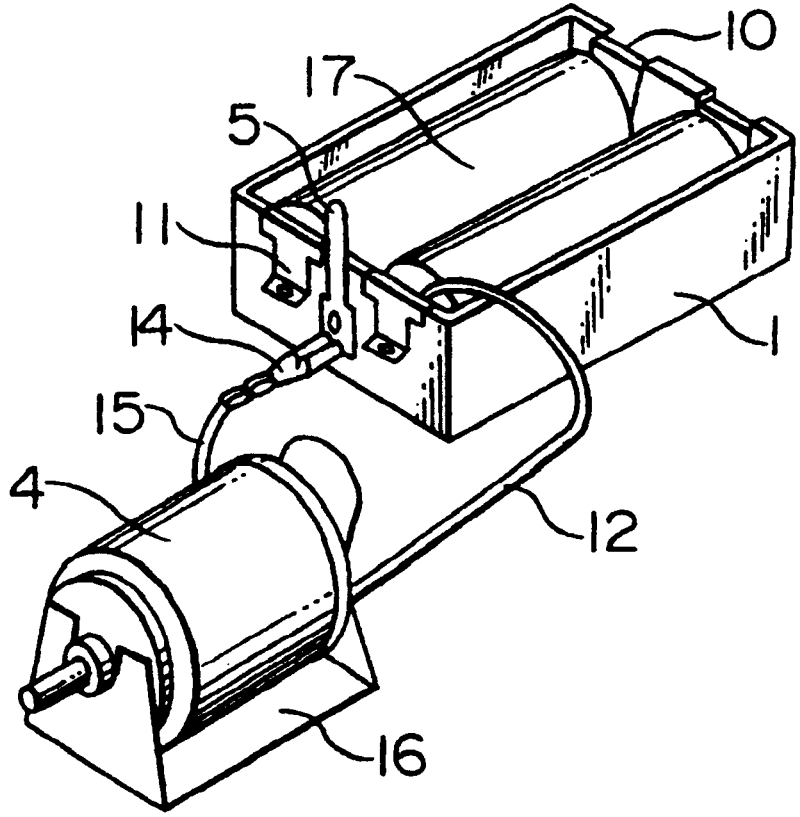

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patentable as amended.

Claims 2–5 and 7, dependent on an amended claim, are determined to be patentable.

New claims 8 and 9 are added and determined to be patentable.

1. A battery box formed of a miniature motor package, comprising:
    an upper package part including walls forming an upper portion of a housing and including wall edges defining a lower opening;
    a lower package part including walls forming a lower portion of a housing and including wall edges defining an upper opening, said upper housing part being joined with said lower housing part at said edges to form the battery box;
    battery connecting terminals formed of conductive metal and having a U-shaped section;
    indented portions formed in edges in at least one of said upper housing part and said lower housing part to define terminal mounting means with terminal mounts for receiving *said* battery-connecting terminals *clipped on the package part in a direction from said edge along said walls* which said wall edges of said upper package part and/or said wall edges of said lower package part have said terminals mounted thereto *with each of said battery-connecting terminals having an inside part of said U-shaped section inside a corresponding one of said package parts and an outside part of said U-shaped section outside said corresponding one of said package parts,* one of said upper part and said lower part having two terminal mounts and another of said upper part and said lower parts having four terminal mounts;
    a switch formed of an electrically conductive material, said switch being rotatably mounted adjacent to one of said terminal mounts on said upper part;
    an additional switch made of electrically conductive material, said additional switch being rotatably mounted adjacent to one of said terminal mounts on said lower part, *said inside part of each U-shaped section having a battery face for establishing electrical contact with a battery and said outside part of each U-shaped section having a switch face for establishing electrical contact with one of said switch and said additional switch.*

6. A battery box formed of a miniature motor package, comprising:
    an upper package part including walls forming an upper portion of a housing and including wall edges defining a lower opening;
    a lower package part including walls forming a lower portion of a housing and including wall edges defining an upper opening, said upper housing part being joined with said lower housing part at said edges to form the battery box;
    battery connecting terminals formed of *resilient* conductive metal and having a U-shaped section;
    indented portions formed in edges in at least one of said upper housing part and said lower housing part to define terminal mounting means providing mounting seats for receiving said battery-connecting terminals *clipped on the package part in a direction from said edge along said walls* by which said wall edges of said upper package part and/or wall edges of said lower package part have said terminals mounted thereto *with each of said battery-connecting terminals having an inside part of said U-shaped section inside a corresponding one of said package parts and an outside part of said U-shaped section outside corresponding one of said package parts,* one of said upper part and said lower part having two mounting seats and another of said upper part and said lower parts having more than two mounting seats;
    a switch formed of an electrically conductive material, said switch being rotatably mounted adjacent to one of said terminal mounts on said upper part;
    an additional switch made of electrically conductive material, said additional switch being rotatably mounted adjacent to one of said terminal mounts on said lower part, *said inside part of each U-shaped section having a battery face for establishing electrical contact with a battery and said outside part of each U-shaped section having a switch face for establishing electrical contact with one of said switch and said additional switch.*

8. *A battery box formed of a miniature motor package, comprising:*
    *a first package part including walls forming a first portion of a housing and including wall edges defining an opening;*
    *a second package part including walls forming a second portion of a housing and including wall edges defining an opening;*
    *battery connecting terminal formed of conductive metal and having a U-shaped section;*
    *indented portions formed in edges in said first housing part and said second housing part to define terminal mounting means providing mounting seats for receiving said battery-connecting terminals clipped on the package part in a direction from said edge along said walls by which said wall edges of said first package part and/or wall edges of said second package part have said terminals mounted thereto with each of said battery-connecting terminals having an inside part of said U-shaped section inside a corresponding one of said package parts and an outside part of said U-shaped section outside said corresponding one of said package parts, said first package part having four mounting seats including a first and second mounting seat defining a central joggled portion and a third and fourth mounting seat defining another central joggled portion, said second package part having two mounting seats including a second package part mounting seat with a joggled portion on each side and a second package part another mounting seat with a joggled portion at each side, said central joggled portion being* received in said second package part mounting seat and said another central joggled portion being received in said another second package part mounting seat, said joggled portion on each side of said second package part mounting seat being received in said first and second mounting seat respectively and said joggled portion on each side of said second package part another mounting seat being received in said third and fourth mounting seat respectively when said first housing part is joined with said second housing part at said edges to form the battery box;

a switch formed of an electrically conductive material, said switch being rotatably mounted adjacent to one of said terminal mounts on said upper part;

an additional switch made of electrically conductive material, said additional switch being rotatably mounted adjacent to one of said terminal mounts on said lower part, said inside part of each U-shaped section having a battery face for establishing electrical contact with a battery and said outside part of each U-shaped section having a switch face for establishing electrical contact with one of said switch and said additional switch.

9. A battery box using a miniature motor package according to claim 8, wherein:

a positioning part is provided formed by a inside bottom portion of said first part protruding toward said opening to defining battery receiving means for receiving two batteries;

a positioning part is provided formed by a boring provided in an inside bottom portion of said second part, said boring defining a single battery receiving member for receiving a single battery.

* * * * *